United States Patent [19]
Megard

[11] 4,137,836
[45] Feb. 6, 1979

[54] APPARATUS FOR THE PRODUCTION OF CHEESE

[75] Inventor: Pierre Megard, Nantua (Ain), France

[73] Assignee: Etablissements Chalon-Megard (Societe Anonyme), La Cluse (Ain), France

[21] Appl. No.: 742,453

[22] Filed: Nov. 17, 1976

[30] Foreign Application Priority Data

Nov. 18, 1975 [FR] France .................... 75 35744

[51] Int. Cl.² ................ A01J 11/06; A01J 25/11
[52] U.S. Cl. ............................. 99/454; 99/456
[58] Field of Search ........... 99/452, 454, 456, 458, 99/459, 472; 426/36, 478, 491, 495, 517, 582; 210/406, 416

[56] References Cited

U.S. PATENT DOCUMENTS

| | | | |
|---|---|---|---|
| 3,468,026 | 9/1969 | Robertson | 99/454 |
| 3,606,683 | 9/1971 | Joux | 426/491 |
| 3,693,256 | 9/1972 | Joux | 99/459 |
| 3,982,480 | 9/1976 | Kamphuis | 99/456 |

FOREIGN PATENT DOCUMENTS 915132  1/1963  United Kingdom ............. 99/458

Primary Examiner—Harvey C. Hornsby
Assistant Examiner—Arthur O. Henderson
Attorney, Agent, or Firm—Karl F. Ross

[57] ABSTRACT

In the formation of cheese in which the separation of the curd and the serum and the molding of the curd are carried out under the action of gravity in a perforated upright tube, the gravitational action is combined with evacuation of the space surrounding the perforated tube to aspirate the serum and increase the relative density of the curd with respect to the serum, thereby speeding up the separation and improving the molding process.

3 Claims, 3 Drawing Figures

APPARATUS FOR THE PRODUCTION OF CHEESE

FIELD OF THE INVENTION

The present invention relates to an apparatus for the production of cheese and, more particularly, to improvements in separating the serum or whey from the curd and the molding of the curd in the presence of the serum prior to cutting of the molded body into portions of a given length corresponding to the final product.

BACKGROUND OF THE INVENTION

In the production of so-called semiripe or semiprocessed cheeses and especially in the production of portions of cheese in which the curd is molded into the final shape in the presence of the serum and the serum or whey is simultaneously withdrawn, two systems have been found to be sufficiently practical for actual use.

Thus, there are presently employed units for molding and cutting in which the curd is molded and prepressed in the presence of serum, then cut into parallelepipedal portions, whereupon these portions are placed in molds. A primary pressing is then carried out to impart the final shape, as a rule a generally cylindrical configuration, to the cheese body. Thereafter, the cheeses are demolded and can be introduced in other molds for a final pressing operation in which they retain the cylindrical configuration.

The aforedescribed process, although currently in use, is manifestly illogical because it requires the formation of an intermediate body of parallelepipedal form in order to obtain a different configuration, almost always cylindrical. While the process can be carried out automatically in the above-described apparatus using movable or fixed bottoms for the pressing operation, there nevertheless is the disadvantage that a plurality of steps are required to obtain the final product and the irrational sequence set forth above must be followed therewith.

There are also in use devices for molding, prepressing and cutting the molded cheese curds into portions which consist essentially of an envelope in the interior of which are disposed perforated-wall molding tubes having vertical axes. These tubes permit the molding of the curd and a prepressing thereof in the presence of the serum or whey, the columns of curd being immediately provided with the circular cross section desired in the finished product. At the base of the envelope receiving the tubes, there is provided a system for severing the downwardly advanced column of curd into portions of given lengths which fall into the molds.

The second system, while obviously more rational than the first, has however numerous disadvantages. Firstly, the mixture of curd and whey or serum delivered by the gravity to the perforated tubes is separated by decantation and hence by settling of the curd from the whey only under the effect of gravity and as a result of the difference in density between the grains of the curd and the serum or whey. This difference in density is minor and decreases as the grains are more moist, so that the sedimentation time is extremely long.

To overcome this drawback, certain apparatuses of this latter type have been provided at their upper portions with fluid cylinders actuating the pressing plates which are vertically displaceable in the interiors of the several tubes to press the curd. Such cylinders, however, complicate the construction of the apparatus and render it more costly, while increasing substantially the height of the apparatus and hence the spatial requirement therefor. In addition, the results obtained with this modification are not fully satisfactory because the perforations of the tubes may be warped during operation and hence the prepressing is not uniform over the entire height of the columns of curd so that the productivity of the apparatus, the quality of the products obtained and their uniformity all leave much to be desired.

OBJECTS OF THE INVENTION

It is the principal object of the present invention to eliminate the disadvantages of the last-mentioned system and, more especially, to provide an apparatus for making cheese which utilizes the principle of separation of the curd from the whey and the molding of the curd within the perforated tubes, which can effect the molding and prepressing in the presence of the serum or whey but which avoids the drawbacks of the earlier system and especially eliminates the molding holes or spaces which earlier systems may leave in the prepressed product.

Still another object of the invention is to provide a an apparatus for making a semiripe cheese in which the uniformity of the product is greatly improved.

Still another object of the invention is to provide an apparatus for the fabrication of cheese which functions more rapidly than earlier systems, is capable of producing cheese of high quality, and has none of the inconveniences of excessive occupation of space characterizing some of the earlier systems mentioned above.

It is still another object of the invention to provide a low-cost apparatus which is efficient and rapidly acting for the production of cheese of the type described previously.

SUMMARY OF THE INVENTION

These objects, and other which will be apparent hereinafter, are attained, in accordance with the present invention, in the production of cheese in which the action of gravity in separating the curd from the whey or serum is combined with the effect of a suction or depression created in the interior of the envelope surrounding the perforated molding tubes to aspirate the serum or whey therefrom and hence increase the relative density of the curd with respect to the serum.

Thus the invention is carried out in a system of the type generally described above but with some modifications as will be detailed below, namely, an apparatus in which an envelope spacedly surrounds a plurality of perforated curd-molding tubes to which the mixture of curd and whey is fed, the tubes having upright axes. According to the invention, this envelope, which is provided at its bottom with means for severing predetermined lengths of the curd column from the latter at the bottom of the tubes in cylindrical portions, is hermetically sealed and is provided with a suction source or pump adapted to create a reduced pressure within the envelope and around the perforated tube wall to enable the evacuation of the serum from the space surrounding the tubes and hence increase the rate of separation of the serum or whey from the curd while maintaining the serum or whey in contact with the curd so that the molding operation of the curd into its cylindrical form is effected in the presence of the serum.

Because of this improvement, the decantation of the curd results from the combination of two phenomena, namely, a gravitational effect analogous to that observed heretofore in the known apparatus and due primarily to the difference in intensity of the curd and the whey. The second effect, which results in an increase in the relative density of the curd with respect to the serum, is obtained by dynamic removal of the serum of whey by aspiration, thus reducing the quantity of the serum of the mixture curt-whey. The combination of these two effects permits substantially more rapid decantation and hence speeds up the molding process with respect to conventional techniques with the following major advantages: a considerable improvement in productivity, an improvement in the quality and uniformity of the finished product such that the composition and weight of the portions of the curd column which are severed at predetermined lengths are practically constant, an improvement in the quality even of the byproducts obtained from the serum, and an increase of cleanliness and sanitary character of the product and the apparatus which results from the fact that the process is carried out in a completely sealed unit and the fact that the prepressing by settling of the curd does not require any external intervention such as pressing by a platen actuated by a cylinder.

As noted, the invention also concerns an apparatus for the production of cheese specific to the aforedescribed method, i.e. provided with the necessary means for carrying out this method.

According to a feature of the invention, the apparatus comprises an envelope receiving in its interior the perforated molding tubes with vertical axes and, at the base of which is disposed a system for cutting lengths of the molded curd from the column thereof. This cutting system is provided with a sliding blade means. According to the invention this envelope is provided with means to enable it to be hermetically sealed at its upper and lower ends. At the bottom, the envelope is preferably sealed between its bottom and the sliding cutter, a duct comminicating between the interior of the envelope and a reservoir adapted to receive the whey or serum and which is connected, in turn, to a suction source adapted to generate a reduced or subatmospheric pressure, i.e. a vacuum in the interior of the envelope. The latter source may be a pump for displacing the whey but preferably is a gas-displacing suction pump for evacuating the reservoir.

In one embodiment of the invention the intermediate reservoir has a volume in excess of the volume of the serum or whey to be aspirated so that the whey is separated from the intake to the suction pump by a gas space at the top of the reservoir which communicates with the suction source. The bottom of the reservoir is connected by a conduit to an upper portion of the envelope.

In a more compact embodiment of the invention, the intermediate reservoir is mounted directly upon the envelope and surrounds the upper portion of the envelope or casing, the top of the reservoir communicating directly with the interior of the envelope.

According to still another feature of the invention, the means for hermetically sealing the envelope at its lower portion is constituted by an inflatable or distendable joint or seal adapted to be compressed between the lower edge of the envelope and against the upper face of the sliding blade.

Finally, the perforated tubes disposed in the interior of the envelope can be slightly frustoconical, i.e. tapered, so as to facilitate the descent of the column of curd gradually and at a rate enabling the cutting of the portions therefrom, at their base.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
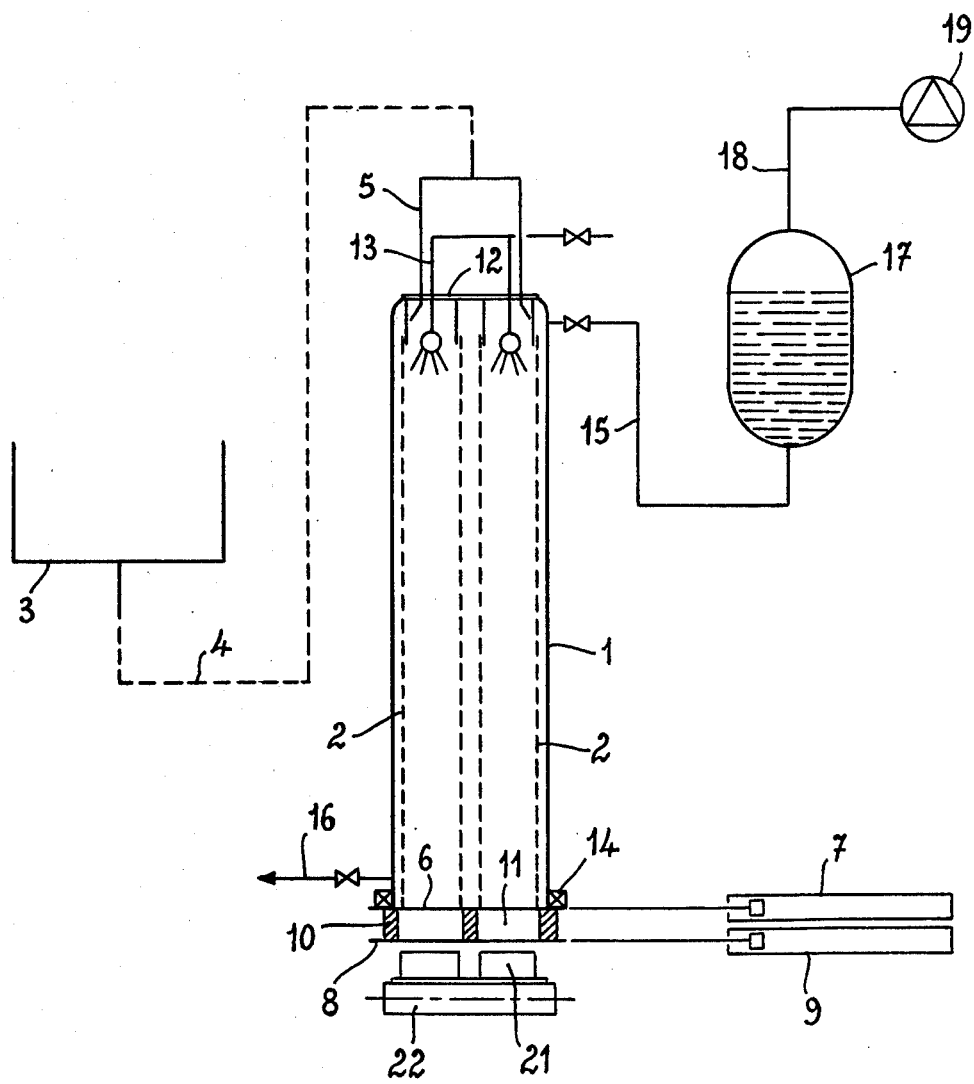
FIG. 1 is a vertical section through a first embodiment of the invention, illustrating diagrammatically, in which the intermediate reservoir is spaced from the envelope surrounding the perforated tube.

In the three Figures of the drawing, similar reference numerals are used to identify identical functioning elements.

The apparatus shown in FIG. 1 comprises in the conventional manner, an envelope or housing 1 having vertical walls, in the interior of which are disposed a plurality of perforated molding tubes 2 having vertical axes. The upper part of the envelope 1 is connected to a cheese processing vat 3 via a supply pipe 4, which can include a feed pump if suction is insufficient to draw the mixture, terminating in a distribution head 5 feeding the mixture of curd and whey to the several tubes 2.

The lower part of the envelope 1 is provided with a cutting device which is also conventional in the art and has not been described in detail since it itself does not constitute a contribution of this invention. The cutting device comprises a sliding blade 6 in the form of a plate actuated by fluid-powered cylinder 7, a second sliding plate 8 having the role of a shutter and disposed below the cutting blade 7 and also actuated by a fluid-powered cylinder which is represented at 9 and a fixed shaper 10 disposed between the two blades and having circular passages 11 formed as extensions of the perforated tubes 2 and aligned with the interiors thereof.

According to the invention, the envelope 1 is constituted in a manner which permits the withdrawal of liquid by suction from the space surrounding the perforated tubes 2. The upper part of the envelope is hermetically closed by a horizontal plate 12 traversed by the tubes of the distribution head 5 and by auxiliary conduits 13 forming part of a washing device. The lower portion of the envelope 1 is sealed by an inflatable seal 14 adapted to be compressed between the lower edge of the envelope and the upper face of the cutter 6 when the latter is in its advanced position as shown in FIG. 1.

In the embodiment of FIG. 1, the envelope is connected to its upper end by a pipe 15 to the bottom of an intermediate reservoir 17 spaced from the envelope 1. At its bottom, the envelope 1 is provided with a pipe 16 provided with a valve for draining and venting the envelope. The intermediate reservoir 17 is connected at its upper end by a pipe 18 to a suction pump 19.

Figure 2:
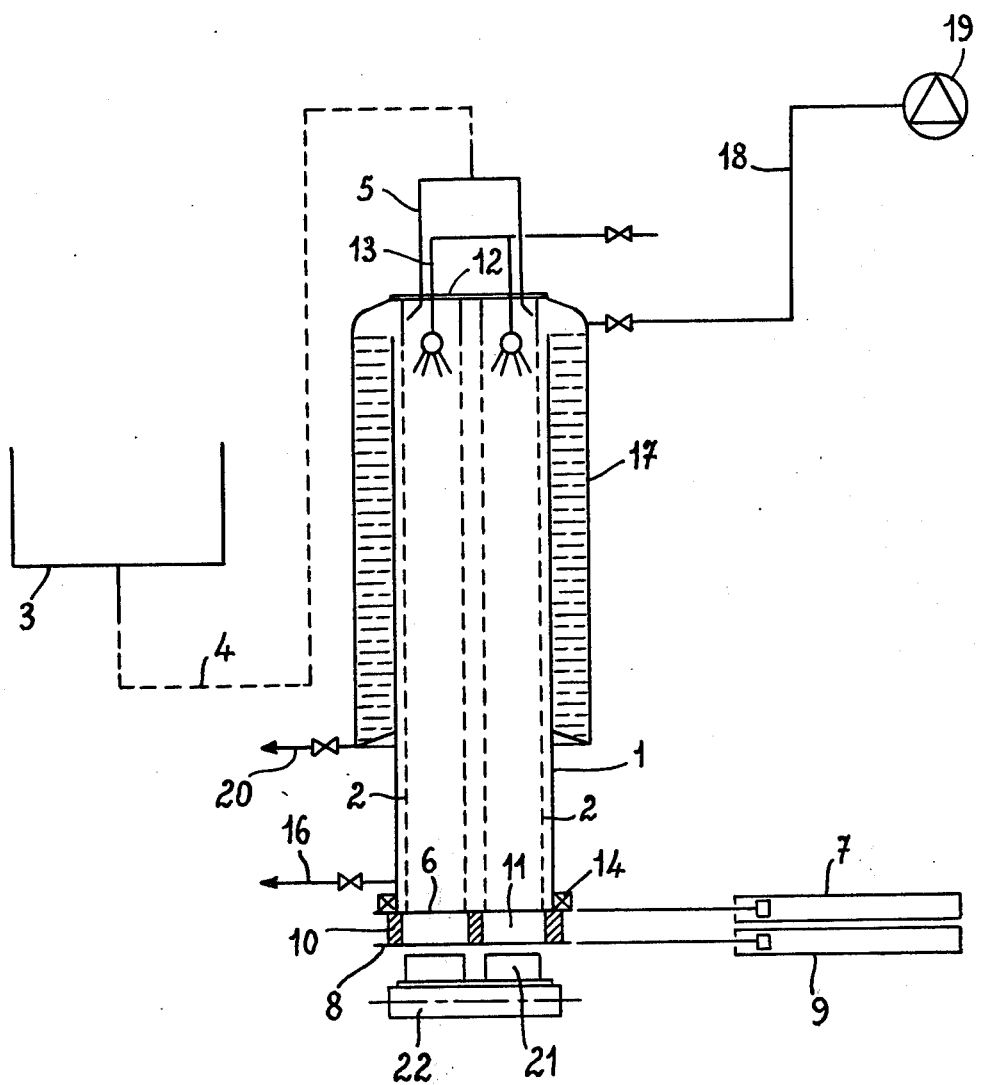
FIG. 2 is a similar view of another embodiment of the invention in which the intermediate reservoir is mounted upon and surrounds the envelope directly.

In the embodiment of FIG. 2, the intermediate reservoir 17 is annular and cylindrical in configuration and surrounds the upper part of the envelope 1. Thus the tubes 2 are disposed in the interior of a "double envelope".

The upper part of reservoir 17 communicates directly with the interior of envelope 1 while its lower part is provided with a draining pipe 20. As described in connection with FIG. 7, another pipe 18 connects reservoir 17 to a suction pump 19.

The apparatus operates in a closed system without external intervention under the action of the suction pump 19 combined with gravity. The reduced pressure created in the interior of envelope 1 enables the filling of the latter with a mixture of curds and serum or whey from the vat 3, the mixture being distributed into the several tubes 2 by the feed pipe 4 and the distribution of the 5. The serum percolates through the perforations of the tubes 2 while the curds settle under the double effect of the difference in density between the curd and the whey and as a function of the aspiration. Any excess of the serum or whey is received in the intermediate reservoir 17 and the seal at the base of the envelope is ensured by the expanding seal 14. After draining the remaining serum from the envelope via the pipe 16, the seal 14 is deflated to permit the cutting system to become effective in the following manner: the shutter 8 is in an advanced position and the blade 6 is withdrawn by cylinder 7 to permit the columns of whey to move downwardly and come to rest on the shutter 8, their shape being maintained by the form 10. The cutter 6 is then shifted to the left (FIG. 1 or FIG. 2) to cut off a length of the curd column equal to the height of the form 10. Finally the shutter 8 is withdrawn by the cylinder 9 to permit the severed body of cheese to fall into the individual molds 21 disposed on an endless conveyor 22 and the shutter 8 is again advance into its blocking position. The cheese can be processed in the mold 21 in the conventional manner. It should be noted that the descent of the columns of cheese can be facilitated by a slight frustoconical configuration of the perforated tubes 2, i.e. a slight taper such that the diameter at the base of the tubes is slightly greater than the diameter at the top thereof.

Figure 3:
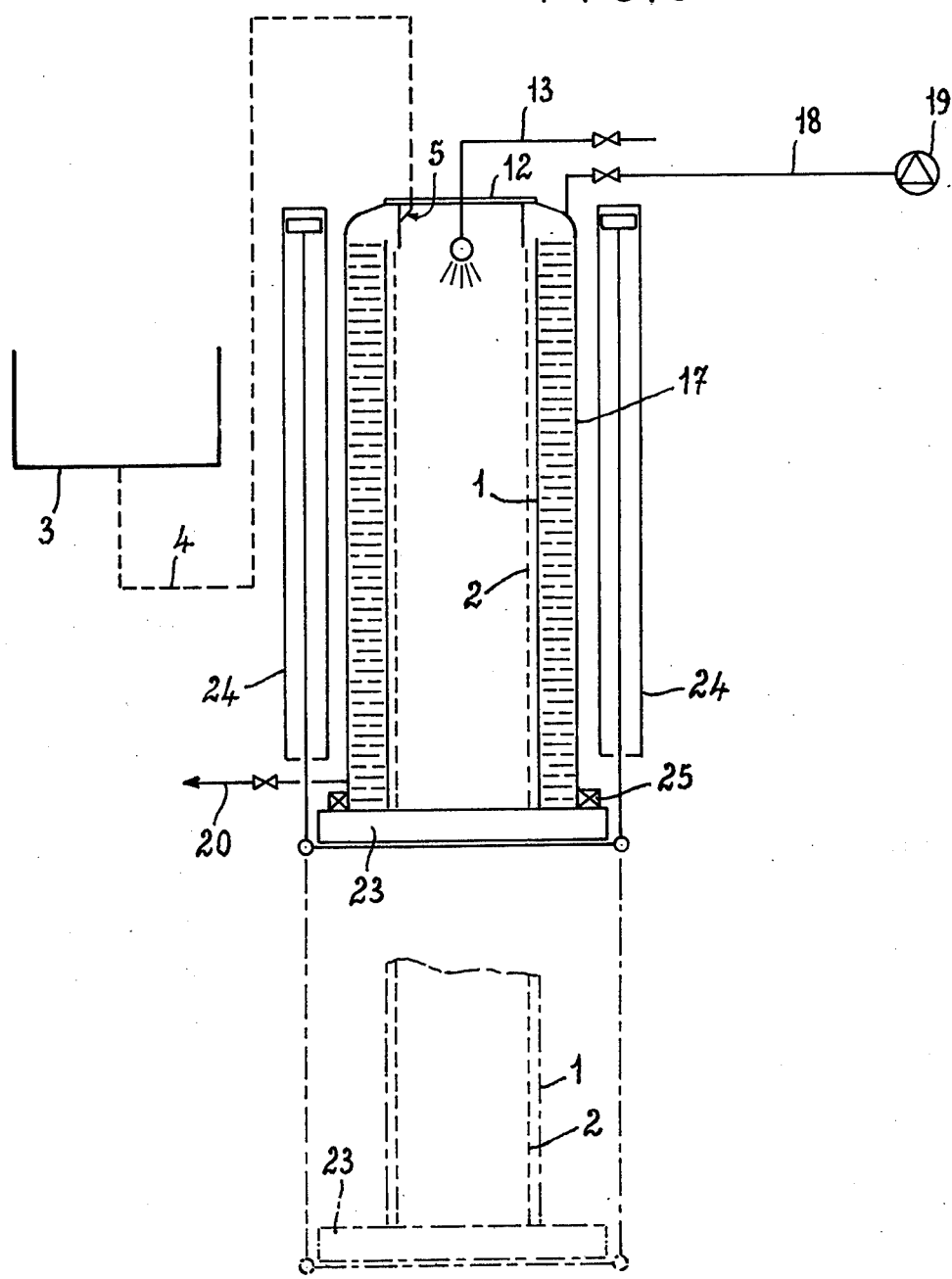
FIG. 3 is still another similar view illustrating a modification in which only a single perforated tube is provided within the envelope.

FIG. 3 shows another embodiment of the apparatus and the invention in which again the intermediate reservoir 17 surrounds the envelope 1, this apparatus being particularly adapted to the fabrication of bodies of cheese of large dimension, for example, large blocks of Emmenthal cheese. In the embodiment, only a single large diameter perforated tube or lining 2 is disposed in the envelope 1 to play the same role as the plurality of tubes heretofore described. The cutting arrangement is here eliminated and the envelope 1 and its perforated lining 2 is mounted movably on the interior of the intermediate reservoir 17 on a support plate 23 which is vertically displaceable by an elevating system here shown to be constituted by two laterally spaced vertical cylinders 24. In order to generate the suction which enables the whey to be drawn through the lining 2, the envelope 1 and its lining 2 are raised on the support plate 23 by the cylinders 24. The seal is ensured between the support plate 23 and the fixed seal 25 mounted on the base of the exterior wall of the intermediate cylinder 17. Suction is then applied as previously described.

After draining of the residual whey in the intermediate reservoir 17 via pipe 20, the support plate 23 is lowered by cylinders 24 together with the envelope 1 and its interior lining full of curd as shown in broken lines in FIG. 3. The envelope and lining 2 can be shifted to another station for pressing of the curd and replaced by another envelope with perforated internal lining.

The process of the present invention and the apparatus, particularly desirable for the production of semiripe or soft cheeses or pressed cheese but itself equally advantageous for the production of ripe cheeses and blue molded cheeses, especially spreading cheeses of all types.

Naturally the invention is not limited to the specific embodiment illustrated and described and can, for example, include all variants within the scope of the appeared claims permitting the process of the invention to be carried out. Of course the means by which the reduced pressure is created in the interior of the envelope from any one of the embodiments can be used on any other and may be replaced by other means for aspirating the whey from the system.

I claim:

1. An apparatus for the production of cheese, comprising: at least one upright perforated tube adapted to receive a mixture of curd and whey and to permit the sedimentation of the curd in the whey within said perforated tube;
   a nonperforated elongated upright envelope spacedly surrounding said tube over the entire length thereof and hermetically sealed to enable evacuation of the space between said tube and said envelope;
   a reservoir of a size sufficient to collect said whey communicating with said space and adapted to receive liquid from said space;
   means for draining liquid from said reservoir; and
   a suction pump connected to an upper portion of said reservoir whereby evacuation of said reservoir separates whey from said envelope into said reservoir and increases the relative density of the curd with respect to the whey in said tube,
   said reservoir being spaced from said envelope and the bottom of said reservoir being connected to the top of said envelope, the bottom of said tube being provided with portioning means for separating the sedimented curd into equal-volume bodies of cheese.

2. An apparatus for the production of cheese, comprising: at least one upright perforated tube adapted to receive a mixture of curd and whey and to permit the sedimentation of the curd in the whey within said perforated tube;
   a nonperforated elongated upright envelope spacedly surrounding said tube over the entire length thereof and hermetically sealed to enable evacuation of the space between said tube and said envelope;
   a reservoir of a size sufficient to collect said whey communicating with said space and adapted to receive liquid from said space;
   means for draining liquid from said reservoir; and
   a suction pump connected to an upper portion of said reservoir whereby evacuation of said reservoir separates whey from said envelope into said reservoir and increases the relative density of the curd with respect to the whey in said tube,
   said reservoir surrounding said envelope and communicating therewith at the upper portion of said envelope and said reservoir, said tube being provided with portioning means for separating the sedimented curd into equal-volume bodies of cheese.

3. An apparatus for the production of cheese, comprising: at least one upright perforated tube adapted to receive a mixture of curd and whey and to permit the sedimentation of the curd in the whey within said perforated tube;

a nonperforated elongated upright envelope spacedly surrounding said tube over the entire length thereof and hermetically sealed to enable evacuation of the space between said tube and said envelope;

a reservoir of a size sufficient to collect said whey communicating with said space and adapted to receive liquid from said space;

means for draining liquid from said reservoir; and a suction pump connected to an upper portion of said reservoir whereby evacuation of said reservoir separates whey from said envelope into said reservoir and increases the relative density of the curd with respect to the whey in said tube, said reservoir surrounding said envelope and communicating therewith at the top of the envelope and reservoir, said envelope having a movable portion receiving said tube and replaceably mounted in said reservoir.

* * * * *